United States Patent [19]

Liu et al.

[11] Patent Number: 5,363,247
[45] Date of Patent: Nov. 8, 1994

[54] FILTER DEVICE FOR COLOR OPTICAL SCANNERS

[75] Inventors: Hong-Wen Liu; Chih-Hong Hsu; Jeff Hsiao, all of Hsin-Chu, Taiwan, Prov. of China

[73] Assignee: Must Systems, Inc., Hsinchu, Taiwan, Prov. of China

[21] Appl. No.: 1,044

[22] Filed: Jan. 6, 1993

[51] Int. Cl.⁵ .......................... G02B 7/00; G02B 5/20; G02B 26/00
[52] U.S. Cl. ..................... 359/889; 359/891; 359/892
[58] Field of Search .................. 359/889, 891, 892

[56] References Cited

U.S. PATENT DOCUMENTS

| | | | |
|---|---|---|---|
| 2,484,323 | 10/1949 | Sweet | 359/889 |
| 2,616,342 | 11/1952 | Thompson | 359/889 |
| 4,809,062 | 2/1989 | Chen | 358/75 |
| 5,161,069 | 11/1992 | Jowang | 359/889 |

*Primary Examiner*—Jon W. Henry
*Attorney, Agent, or Firm*—W. Wayne Liauh

[57] ABSTRACT

A tapered-shaped rotatable frame with at least three filter windows, with at least three filters installed on it, a lens stand which includes a supporting means to rotatably support the frame. The angle between the supporting means and the frame's surface is supplementary to the angle between the supporting means and the frontal surface of the lens.

3 Claims, 2 Drawing Sheets

FILTER DEVICE FOR COLOR OPTICAL SCANNERS

BACKGROUND OF THE INVENTION

1. Field of the Invention

This invention relates to a filter device for color optical scanners, especially to a filter device used in color optical scanners which can reduce the volume of the scanner system. With the employment of a new design, a tapered filter module, this invention reduces the space occupied by the filter module and the lens, resulting at a more compact scanner system.

2. Description of Prior Art

Optical scanners are a very important device for the input operation for computer systems. By using an optical scanner, image data (graphics or characters) recorded on a medium can be input to a computer system for further processing.

The theory for optical scanners is to utilize a light source which emits a light beam onto a recording medium, such as, a piece of paper. The light beam reflects from (if the medium is not a transparent medium, like paper) or penetrates through (if the medium is a transparent one, like negatives) the medium so that data representing a linear component (approximately 1/300 to 1/1000 inch in height) of the image recorded on said medium may be carried on by the light beam. The light beam later passes through a light path and reaches a lens. Dioptric image formation then is achieved by the lens and the light beam containing the recorded image data is projected to an array of linear light sensors, such as a CCD chip. The light sensor array is able to sense the illumination, or gray level, of a portion, or spot (approximately, 1/300 to 1/1,000 inch wide), of the light beam, and to transfer the illumination value into electrical signals. These signals are identical to the image components of said linear component of the scanned image and are then input onto a computer system for further processing.

The optical scanner as described above, if applied to the processing of color image, normally utilizes a "color separation device" to obtain each primary-color components of the scanned image. In other words, red, blue and green components of an image are scanned respectively and the data obtained therefrom are integrated by a computer system to form an integrated image in the computer system. In the prior art, some solutions for this purpose are proposed. Scanners using light sources which are able to emit lights of the three primary colors and scanners using color filters letting light beams of the three primary colors passing through are both the most common solutions.

Taiwan Patent Application No. 77105326 (U.S. Pat. No. 4,809,062) is an "Optical Color Line Scanning and Imaging Device Having a roller Drive". This invention relates to a color separation wheel which is positioned in front of a lens. While the wheel rotates, filters of three primary colors will pass in front the lense in turn, letting each primary-color component of the scanned image entering into the CCD and the color separation process being obtained.

Taiwan Patent Application No. 78208423 relates to a "Filter Device for Color Optical Scanners." The filters used in this 78208432 patent application line up horizontally in front of the lens and move horizontally during the scanning. The space occupied by the filter device is:

$$170 * 20 * 30 = 102,000 \text{ mm}^3.$$

This 78208432 patent application serves to reduce the volume of the filter device of said No. 77105326 patent application.

Taiwan Patent Application No. 78302955 relates to a "Filter for Color Image Scanners" in which all filters are located on a fan-shaped filter frame. While the filter frame swings left and right on an axis located at the center of gravity of the frame, color separation operation is obtained. Space needed for this No. 78302955 patent is approximately:

$$40 * 40 * 30 = 48,000 \text{ mm}^3.$$

Taiwan Patent Application No. 7920924 relates to a "Color Separation Mechanism for Black-and-White/-Color with a rolling barrel" which installs an eight-surface Rolling Barrel with color filters on each surface. This device locates in front of a lens with at least one of its surfaces facing the lens. Color separation is achieved when the roller spins. Space needed for this filter device is:

$$60*60*40 = 144,000 \text{ cm}^3.$$

Filter devices as described in the above-mentioned patents need a space larger than they actually claimed for operation. This is because that when they are in operation, an operation space is required. Nevertheless, filter devices and lenses (and image sensor array) are installed separately in these conventional devices. As a result more space is needed when the entire system is in operation.

Therefore, it has become a need for the industry to have a filter device for color optical scanners which may reduce the space occupied by the filter device and for the operation of color separation, and to reduce the size of the scanner system as a whole.

It is thus a purpose of this invention to provide a filter device for color optical scanners with a smaller volume.

An other purpose of this invention is to provide a filter device for color optical scanners that can combine the filter device with the lens used in the scanner, so as to reduce the volume of the scanner system.

BRIEF DESCRIPTION OF THE INVENTION

This and other purposes and advantages of this invention may be obtained through the employment of a tapered filter module. The filter device of this invention comprises a tapered filter frame with filters installed on it. The taper allows the lens to locate (hide) within it and reduces the space occupied by the filter module and the lens, resulting at a more compact scanner system.

This invention can be understood more clearly with the following description, as illustrated in the accompanying drawings:

IN THE DRAWINGS

FIG. 1 demonstrates the spatial relations of filters of the filter device for color optical scanners of this invention.

DETAILED DESCRIPTION OF THE INVENTION

Figure 1:
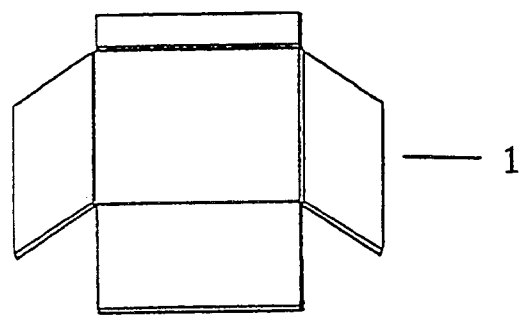

FIG. 1 shows the spatial relations of filters of the filter device for color optical scanners of this invention. As illustrated the filter device of this invention uses four filters, which were joined with each other at their rims and form a cone.

Figure 3:
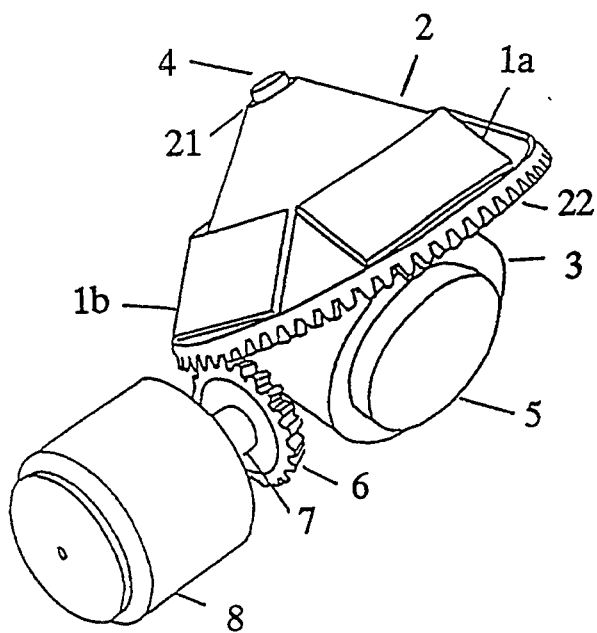
FIG. 3 illustrates the structural diagram of the filter device for color optical scanners of this invention.
Figure 2:
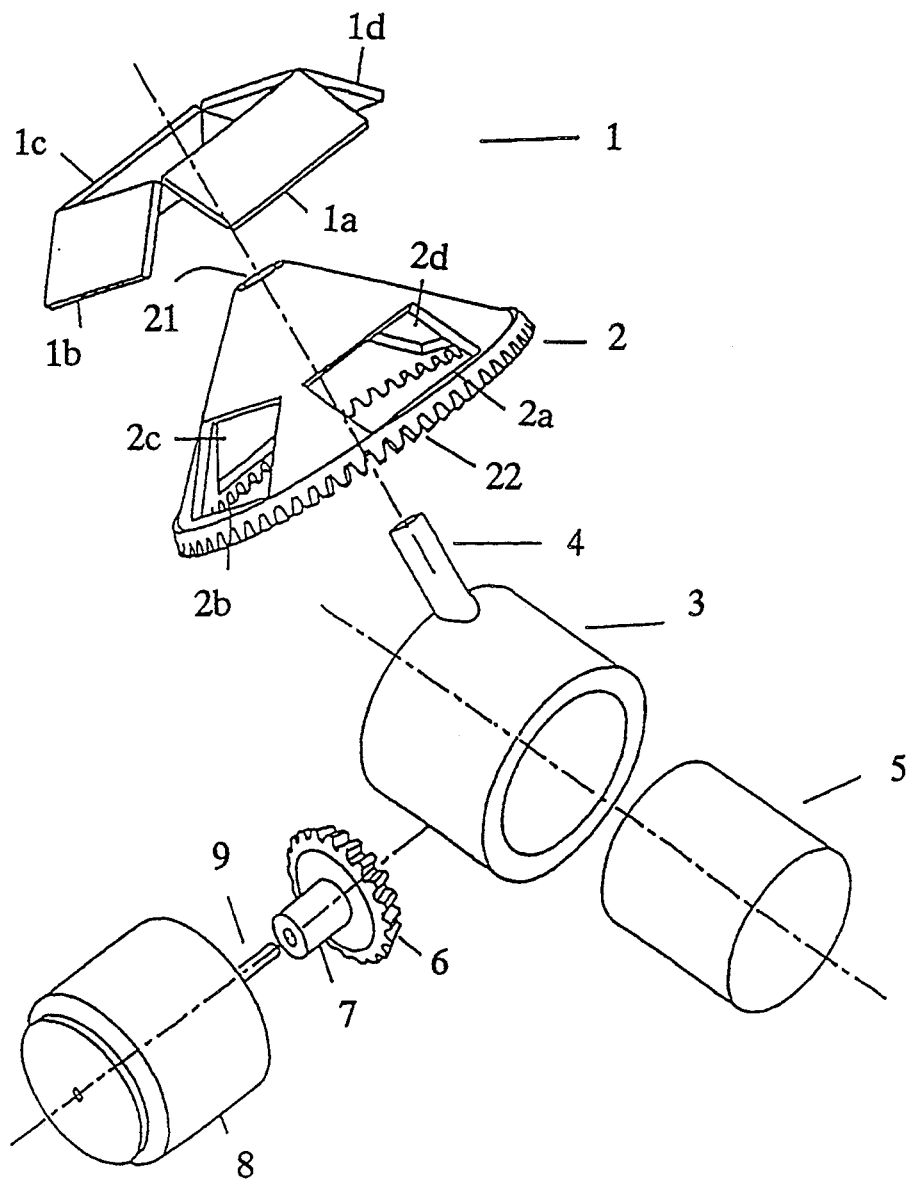
FIG. 2 illustrates the structural explosion diagram of the filter device for color optical scanners of this invention.

FIG. 2 shows the structural explosion diagram of the filter device for color optical scanners of this invention. FIG. 3 illustrates the structural diagram of the filter device for color optical scanners of this invention. As illustrated, the embodiment of this invention comprises a group of filters 1. These filters are labeled as 1a 1b 1c and 1d, each of the primary color, red, blue and green, and white, respectively. The frame 2 has a tapered-shaped structure, with four filter windows 2a 2b 2c and 2d, all arranged at each sector of the frame and with equal angles between every two windows.

In application four filters 1a 1b 1c and 1d are fixed (attached or screwed) onto the outer surface of the corresponding windows 2a 2b 2c and 2d on the frame covering the windows completely. A hole 21 locates on the top of the tapered frame body while a bevel gear 22 is installed at the bottom of the frame.

The lens shelf 3 is a tube-shaped shelf where a shaft 4 is installed at the front end at an up angle of approximately 45 degrees. The shaft 4 has a recess 41 so it may penetrating a hole 21 in the top of the taper-shaped frame 2 of the filter device, and rotatably support the frame 2. This enables the frame 2 to spin on the shaft when suitable driving force is applied. Although the frame 2 can be fixed on the shaft 4 based on the gravity, it would be preferable if screws (not shown) or other appropriate ways are applied to the connection of said frame 2 and said shaft 4.

The lens 5 is installed inside of the lens shelf 3 to at a position corresponding to filter windows 2a 2b 2c and 2d and filters 1a 1b 1c and 1d. After the light beam reflecting from the medium is projected upon one of the filters, and then to the lens 5, the light beam will be filtered and focused onto the sensor array of the CCD.

In application, it is preferred that the angle between the shaft 4 and the surface of the taper-shaped frame 2 is supplementary to the angle between the shaft 4 and the front surface of the lens shelf 3, or the lens 5, to ensure the quality of scanned image data.

The driving gear 6 is a bevel gear. Its teeth can be engaged with the teeth of the bevel gear 22 of the frame 2. The rolling of the driving gear 6 may drive the frame 2 so that it may spin at the axis of the shaft 4. The driving gear 6 is connected with the axle 9 of a motor 8 via a club 7 so that the driving force of the motor 8 may be transmitted to the driving gear 6.

The filter device for color optical scanners of this invention, as integrated according to the above-mentioned structure, is shown in FIG. 3.

In application the frame 2 of the filter device is driven by the motor 8 through the driving gear 6 and spins at the shaft 4 of the lens stand 3 as an axis. Filters 1a 1b 1c and 1d on the frame 2 will enter into the scanning position in front of the lens 5 one by one. The light beam carrying data of the recorded image will be projected through the filter at the scanning position in front of the lens 5 and enter into the lens 5. At that time, the functional filter filters the light and abstracts out image data of each corresponding color of the light beam, and only that color component of that image data enters into the lens 5. The light then will be focused and projected upon the sensor array (not shown) and be transformed into electronic signals by the sensor. These signals are then be input into a computer for further processing.

The filter device of this invention occupies a smaller space than conventional devices. Because the filter device has a tapered shape and spins while changing the filters, it is then unnecessary for the scanner manufacturers to reserve an operation space for the filter device, which contributes to the miniature of the size of the device.

Furthermore, in the present invention, the lens is located (hidden) inside the filter device, meaning that the whole color scanner system does not need to reserve for the distance between the lens and the filter device, which further reduces the volume taken up by the entire mechanism.

The space occupied by the filter device of the present invention is calculated as follows:

$$40 * 20 * 30 = 24,000 \text{ mm}^3.$$

The volume taken up by the device is smaller than any conventional filter device.

While the present invention has been particularly shown and described with reference to preferred embossments thereof, it will be understood by those skilled in the art that the foregoing and other changes in form and details may be made therein without departing from the spirit and scope of the invention.

What is claimed is:

1. A filter device for optical scanners comprising:
   a frame with a conically tapered surface about a central axis, comprising at least three filter windows on said frame which are located in angularly symmetrical relationship with respect to said central axis, and a power transmission means;
   at least three filters each of a primary color, installed on said filter windows, respectively, on said frame;
   a lens shelf having a front surface, said lens self being equipped with a space suited to accept a lens and a supporting means to rotatably support said frame, wherein the angle between the supporting means and the conically tapered surface of said frame is supplementary to that between the supporting means and the front surface of said lens shelf; and
   a power supply, to provide driving power to said power transmission means so that the frame may spin at the axis of said supporting means.

2. The device according to claim 1 wherein said frame has four filter windows.

3. The device according to claim 1 wherein said power transmission means of said frame is a bevel gear, and said power supply comprises a motor, and a gear connected to said motor's driving axle and is able to be engaged with said bevel gear.

* * * * *